UNITED STATES PATENT OFFICE.

HANS STRECKER-AUFERMANN, OF MUNICH, GERMANY.

PROCESS FOR PREPARING PRINTING-PLATES IN A GRAINED MANNER.

1,014,740. Specification of Letters Patent. Patented Jan. 16, 1912.

No Drawing. Application filed January 11, 1910. Serial No. 537,523.

*To all whom it may concern:*

Be it known that I, HANS STRECKER-AUFERMANN, a subject of the German Emperor, and resident of Munich, Germany, have invented a certain new and useful Process for Preparing Printing-Plates in a Grained Manner, of which the following is a specification.

It has been found that besides the fish glue used for carrying out the process forming the subject matter of my previous Patent Number 954,412 issued April 2, 1910, and relating to the preparation of a layer which is sensitive to the light and decomposed into grains, one may still employ other glues in which under certain conditions also no mixing takes place between the Arabic gum and the various kinds of glue, but a separation in the form of small drops of the Arabic gum in the middle of the glue. One may then by means of suitable conditions cause the various separate small drops to unite themselves to form larger and larger drops. These glues are besides all the so called fish glues which have the characters of the " Le Page glue " and of the " photo-engraving glue," the true fish glues and other kinds of glue containing chondrin and glutin and which may also be called chondrogens and collagens. These are the cartilage glues and the bone-glues (hart's horn, tendons, connective tissues, fish scales, whale bone, fish bladder whale larder) as well as the skin glues which have been disintegrated by bacteria or ferments, by long boiling, or by means of sucrate of lime, acetic acid, ammonia, hydrate of chloral or in any other manner. One may still employ in the place of the fish glue the glues called " cold glues " which are to be found in the trade. Mixtures of several kinds of the glues cited above are also suitable for replacing the fish glue. All these glues have the property of being dissolved in water easier than the Arabic gum, or to absorb the water more rapidly than the latter. Now when these glues having a concentration varying between 1.1 and 1.6 and Arabic gum having a concentration varying from 1.1 and 1.6 are mixed, the proportions of the mixture of both varies between 1.1 and 1.8 and said mixture in a chromated state is applied to a metal plate, dried, and afterward provided with the copy of an image. The glues will swell during the operation of etching more rapidly than the Arabic gum so that a long time before the Arabic gum is swollen and has allowed the etching liquid to pass, the glues will have been passed through by the etching liquid even in those parts of the layer, which have been most exposed to the action of the light. It is readily understood that in this case too, the Arabic gum which is embedded in the shape of a grain or vein in the layer of glue applied to the metal plate, opposes a relative resistance to the action of the etching liquid. When using such glues, one may follow in general the indications and recipes given in my previous Patent No. 954,412, April 2, 1910, for the composition of the layer; however it is necessary in each peculiar case to take into account the slightly different character of the glue from the point of view of its viscosity.

If desired, there can be substituted for a portion of the amount of Arabic gum required cheaper kinds of gum and mucilage as well as rosins, paraffin, wax, solid or soft liquid fat (oil) et cetera, which substances like Arabic gum are adapted to resist the action of etching. Or the Arabic gum can be tanned in any well known manner, as for instance by mixing a solution of Arabic gum with a solution of chrome alum, before it is mixed with the glue.

Having now fully described my said invention, what I claim and desire to secure by Letters Patent, is:—

1. A process for preparing printing plates in a grained manner for monochrome and polychrome printing consisting in preparing a chromated mixture of a solution of a glue containing chondrin and glutin, having a concentration varying between 1.1 and 1.6 and an aqueous solution of Arabic gum having a concentration varying from 1.1 and 1.6 the proportions of the mixture of both solutions varying between 1.1 and 1.8, spreading the mixture as a coating over a metal plate, leaving the plate at rest so as to cause small drops of the Arabic gum solution to settle in the said mixture of solutions of Arabic gum and of glue containing chondrin and glutin, causing the said coating to dry so as to render the said drops of Arabic gum resisting to the action of the etching, exposing the plate under a suitable image and directly etching the plate thereafter with solutions of ferric chlorid, substantially as and for the purpose set forth.

2. A process for preparing printing plates in a grained manner for monochrome and polychrome printing, consisting in preparing a chromated mixture of a solution of glue containing chondrin and glutin, the concentration of which solution varies between 1.1 and 1.6 and an aqueous solution of Arabic gum the concentration of which varies between 1.1 and 1.6 and another substance adapted to resist the action of the etching the proportion of said solutions in the mixture varying between 1.1 and 1.8, coating with this mixture a metal plate, leaving the metal plate thus coated at rest, drying the said coating, exposing the said coated plate under a suitable image and etching it directly after the exposition, with solutions of ferric chlorid, substantially as and for the purpose set forth.

3. A process for preparing printing plates in a grained manner for monochrome and polychrome printing consisting in preparing a chromated mixture of a solution of glue containing chondrin and glutin, the concentration of which solution varies between 1:1 and 1:6 and an aqueous solution of Arabic gum the concentration of which varies between 1:1 and 1:6 and a suitable tanning agent, the proportion of said solutions in said mixture varying between 1:1 and 1:8, coating a metal plate with this mixture, leaving the metal plate thus coated at rest, drying the coating of the metal plate, exposing the coated plate under a suitable image and etching it directly after the exposition by means of solutions of ferric chlorid, substantially as and for the purpose set forth.

4. A process for preparing printing plates in a grained manner for monochrome and polychrome printing, consisting in preparing a chromated mixture of a solution of pure glutin, having a concentration varying between 1:1 and 1:6 and an aqueous solution of Arabic gum having a concentration varying from 1:1 and 1:6 the proportions of both solutions varying between 1:1 and 1:8, spreading the mixture as a coating over a metal plate, leaving the plate at rest so as to cause small drops of the Arabic gum solution to settle in the said mixture of solutions, causing the said coating to dry so as to render the said drops of Arabic gum resisting to the action of the etching, exposing the plate under a suitable image and directly etching the plate thereafter with solutions of ferric chlorid, substantially as and for the purpose set forth.

5. A process for preparing printing plates in a grained manner for monochrome and polychrome printing, consisting in preparing a chromated mixture of a solution of pure glutin, the concentration of which solution varies between 1:1 and 1:6 and an aqueous solution of Arabic gum the concentration of which varies between 1:1 and 1:6 and another substance adapted to resist the action of the etching, the proportion of said solutions in the mixture varying between 1:1 and 1:8, coating with this mixture a metal plate, leaving the metal plate thus coated at rest, drying the said coating, exposing the said coated plate under a suitable image and etching it directly after the exposition, with solutions of ferric chlorid, substantially as and for the purpose set forth.

6. A process for preparing printing plates in a grained manner for monochrome and polychrome printing, consisting in preparing a chromated mixture of a solution of pure glutin, the concentration of which solution varies between 1:1 and 1:6 and an aqueous solution of Arabic gum, the concentration of which varies between 1:1 and 1:6 and a suitable tanning agent, the proportion of said solutions in said mixture varying between 1:1 and 1:8, coating a metal plate with this mixture, leaving the metal plate thus coated at rest, drying the coating of the metal plate, exposing the coated plate under a suitable image and etching it directly after the exposition by means of solutions of ferric chlorid, substantially as and for the purpose set forth.

7. A process for preparing printing plates in a grained manner for monochrome and polychrome printing, consisting in preparing a chromated mixture of a solution of a mixture of pure glutin with a glue containing glutin, having a concentration varying between 1:1 and 1:6 and an aqueous solution of Arabic gum having a concentration varying from 1:1 and 1:8, the proportions of mixing both solutions varying between 1:1 and 1:8, spreading the mixture as a coating over a metal plate, leaving the plate at rest so as to cause small drops of the Arabic gum solution to settle in the said mixture of solutions, causing the said coating to dry so as to render the said drops of Arabic gum resisting to the action of the etching, exposing the plate under a suitable image and directly etching the plate thereafter with solutions of ferric chlorid, substantially as and for the purpose set forth.

8. A process for preparing printing plates in a grained manner for monochrome and polychrome printing, consisting in preparing a chromated mixture of a solution of a mixture of pure glutin with a glue containing glutin, the concentration of which solution carries between 1:1 and 1:6 and an aqueous solution of Arabic gum, the concentration of which carries between 1:1 and 1:6, and another substance adapted to resist the action of the etching, the proportion of said solutions in the mixture varying between 1:1 and 1:8, coating with this mixture a metal plate, leaving the metal plate thus coated at rest, drying the said coating, exposing the said coated plate under a suitable image and etching it directly after the exposition, with solutions of ferric chlorid, substantially as and for the purpose set forth.

9. A process for preparing printing plates in a grained manner for monochrome and polychrome printing, consisting in preparing a chromated mixture of a solution of a mixture of pure glutin with a glue containing glutin, the concentration of which solution varies between 1:1 and 1:6 and an aqueous solution of Arabic gum, the concentration of which varies between 1:1 and 1:6 and a suitable tanning agent, the proportion of said solutions in said mixture varying between 1:1 and 1:8, coating a metal plate with this mixture, leaving the metal plate thus coated at rest, drying the coating of the metal plate, exposing the coated plate under a suitable image and etching it directly after the exposition by means of solutions of ferric chlorid, substantially as and for the purpose set forth.

In testimony whereof I have hereunto set my hand in presence of two witnesses.

HANS STRECKER-AUFERMANN.

Witnesses:
 LOUIS MUELLER,
 MATHILDE K. HELD.